United States Patent
Hahn et al.

(10) Patent No.: US 9,111,559 B1
(45) Date of Patent: Aug. 18, 2015

(54) GIMBAL BASED DSA SUSPENSION WITH MICROACTUATOR ATTACHED FROM LOAD BEAM SIDE OF FLEXURE

(71) Applicant: Magnecomp Corporation, Murrieta, CA (US)

(72) Inventors: Peter Hahn, Wildomar, CA (US); Kuen Chee Ee, Chino, CA (US); Long Zhang, Murrieta, CA (US)

(73) Assignee: MAGNECOMP CORPORATION, Murrieta, CA (US)

( * ) Notice: Subject to any disclaimer, the term of this patent is extended or adjusted under 35 U.S.C. 154(b) by 0 days.

(21) Appl. No.: 14/332,046

(22) Filed: Jul. 15, 2014

Related U.S. Application Data

(60) Provisional application No. 61/856,750, filed on Jul. 21, 2013.

(51) Int. Cl.
G11B 5/48 (2006.01)

(52) U.S. Cl.
CPC .............. *G11B 5/4873* (2013.01); *G11B 5/482* (2013.01); *G11B 5/486* (2013.01); *G11B 2220/2516* (2013.01)

(58) Field of Classification Search
USPC ....................................................... 360/294.4
See application file for complete search history.

(56) References Cited

U.S. PATENT DOCUMENTS

| 6,108,175 | A  | * | 8/2000  | Hawwa et al.    | 360/294.4 |
| 6,597,541 | B2 | * | 7/2003  | Nishida et al.  | 360/294.4 |
| 6,731,472 | B2 | * | 5/2004  | Okamoto et al.  | 360/294.3 |
| 6,980,388 | B2 |   | 12/2005 | Ishikawa et al. |           |
| 7,408,745 | B2 |   | 8/2008  | Yao et al.      |           |
| 8,149,545 | B1 | * | 4/2012  | Chai et al.     | 360/294.3 |
| 8,760,813 | B2 | * | 6/2014  | Arai            | 360/244.5 |
| 2011/0096438 | A1 |   | 4/2011 | Takada et al.   |           |
| 2013/0107397 | A1 | * | 5/2013 | McCaslin et al. | 360/244.2 |

* cited by examiner

Primary Examiner — Wayne Young
Assistant Examiner — Carlos E Garcia
(74) Attorney, Agent, or Firm — Intellectual Property Law Offices of Joel Voelzke, APC

(57) ABSTRACT

A gimbal dual stage actuated suspension has a microactuator attached at its distal end to the gimbal in order to effect fine movements of the head slider. The microactuator is mounted on the side of the flexure that is opposite the disk platter and the head slider, and extends in height through an aperture in the load beam. The driving voltage for the microactuator is provided through an aperture in the insulating layer of the flexure to a signal conducting layer in the flexure's electrical circuit. The electrical connection from the signal conducting layer to the microactuator can comprise an electrically conductive adhesive, or an electrically conductive adhesive that contacts an isolated island of the stainless steel support layer in the flexure which is in electrical contact with the conducting layer, which is plated all the way to the stainless steel layer or which is otherwise extended thereto.

20 Claims, 7 Drawing Sheets

TOP VIEW

BOTTOM VIEW

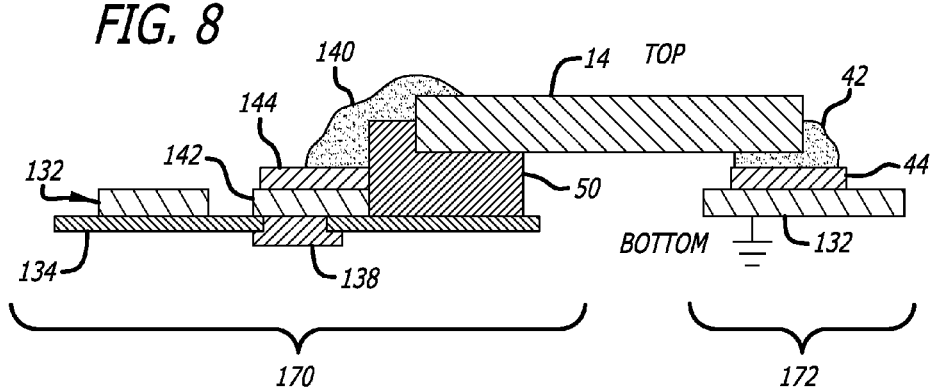
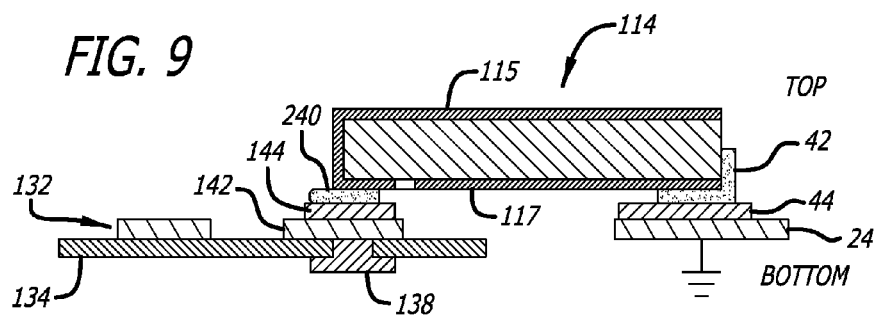

GIMBAL BASED DSA SUSPENSION WITH MICROACTUATOR ATTACHED FROM LOAD BEAM SIDE OF FLEXURE

CROSS-REFERENCE TO RELATED APPLICATIONS

This application claims priority from U.S. provisional patent application Ser. No. 61/856,750 filed Jul. 21, 2013.

BACKGROUND OF THE INVENTION

1. Field of the Invention

This invention relates to the field of disk drive suspensions. More particularly, this invention relates to the field a dual stage actuated (DSA) suspension with a microactuator acting on the gimbal, and the microactuator attached to the flexure from the load beam side opposite the slider side.

2. Description of Related Art

Magnetic hard disk drives and other types of spinning media drives such as optical disk drives are well known. FIG. 1 is an oblique view of an exemplary prior art hard disk drive and suspension. The prior art disk drive unit 100 includes a spinning magnetic disk 101 containing a pattern of magnetic ones and zeroes on it that constitutes the data stored on the disk drive. The magnetic disk is driven by a drive motor (not shown). Disk drive unit 100 further includes a disk drive suspension 105 to which a magnetic head slider (not shown) is mounted proximate a distal end of load beam 107. The "proximal" end of a suspension or load beam is the end that is supported, i.e., the end nearest the base plate which is swaged or otherwise mounted to an actuator arm 103. The "distal" end of a suspension or load beam is the end that is opposite the proximal end, i.e., the "distal" end is the cantilevered end.

Suspension 105 is coupled to actuator arm 103, which in turn is coupled to a voice coil motor 112 that moves the suspension 105 arcuately in order to position the head slider over the correct data track on data disk 101. The head slider is carried on a gimbal which allows the slider to pitch and roll so that it follows the proper data track on the disk, allowing for such variations as vibrations of the disk, inertial events such as bumping, and irregularities in the disk's surface.

Both single stage actuated disk drive suspensions and dual stage actuated (DSA) suspension are known. In a single stage actuated suspension, only voice coil motor 112 moves suspension 105.

In a DSA suspension, as for example in U.S. Pat. No. 7,459,835 issued to Mei et al. as well as many others, in addition to voice coil motor 112 which moves the entire suspension, at least one microactuator is located on the suspension in order to effect fine movements of the magnetic head slider to keep it properly aligned over the data track on the spinning disk. The microactuator(s) provide much finer control and much higher bandwidth of the servo control loop than does the voice coil motor alone, which effects relatively coarse movements of the suspension and hence the magnetic head slider. A piezoelectric element, sometimes referred to simply as a PZT, is often used as the microactuator motor, although other types of microactuator motors are possible. In the discussion that follows, for simplicity the microactuator may be referred to simply as a "PZT" although it will be understood that the microactuator need not be of the PZT type.

FIG. 2 is a top plan view of the prior art suspension 105 in FIG. 1. Two PZT microactuators 14 are affixed to suspension 105 on microactuator mounting shelves 18 that are formed within base plate 11, such that the PZTs span respective gaps in base plate 11. Microactuators 14 are affixed to mounting shelves 18 by non-conductive epoxy 8 at each end of the microactuators. The positive and negative electrical connections can be made from the PZTs to the suspension's flexible wiring trace and/or to the grounded base plate by a variety of techniques including those disclosed in commonly owned U.S. Pat. No. 7,751,153 to Kulangara et al.

Other DSA designs have been proposed in which the microactuators are mounted near the gimbal and act on the gimbal. Such designs are sometimes referred to as gimbal-based DSA suspensions, or simply gimbal DSA suspensions, or GSA suspensions.

SUMMARY OF THE INVENTION

The present invention is of a novel structure and method for mounting the microactuator(s) within a DSA suspension. According to a first exemplary embodiment, a first end of a microactuator is attached to a first and relatively fixed portion of the suspension's flexure or possibly even to the load beam, and a second end of the microactuator opposite the first end is attached to a second and gimbaled portion of the flexure such that actuation of the microactuator moves the head slider for fine positioning of the head slider. The microactuator is attached to a side of the flexure that faces the load beam, i.e., the side of the flexure is opposite the side to which the head slider is attached. The height of the microactuator extends at least partially up through an aperture in the load beam, the aperture being provided in the load beam in order to make room for the microactuator. The microactuator is thus mounted on the load beam side of the flexure rather than on the disk platter side of the flexure as in various previous designs. One electrode or face of the microactuator may be grounded directly to the stainless steel layer of the flexure such as by conductive adhesive. The other electrode or face of the microactuator may be connected to a driving voltage carried by a signal trace within the flexible circuit that is part of the flexure by various methods. According to the first embodiment, a bridge of electrically conductive adhesive such as conductive epoxy connects the driven electrode of the microactuator through an aperture in the insulating layer of the flexure to an exposed portion of the signal conductor that defines a copper contact pad.

According to a second illustrative embodiment, the copper contact pad is directly plated onto an isolated island of stainless steel that has been separated from the rest of the stainless steel support layer of the flexure by etching. The bridge of conductive epoxy extends from the top layer of the microactuator to the isolated island of stainless steel on the side opposite the copper contact pad rather than directly to the copper contact pad as in the first embodiment. The island of stainless steel is preferably plated with nickel (not shown) on its bottom side prior to the copper contact pad being plated onto it, and is preferably plated with gold on its top side before the conductive epoxy bridge is dispensed onto it. As in the first illustrative embodiment, the height of the microactuator extends at least partially up through an aperture in the load beam, the aperture being provided in the load beam in order to make room for the microactuator and thus the microactuator is mounted on the load beam side of the flexure.

One advantage to placing the microactuator on the load beam side rather than the more conventional slider side is that because the height of the microactuator and its adhesive bonds extend up through an aperture in the load beam and at least partially into the space between the upturned side rails in an otherwise conventional load beam, the microactuator is now mostly out of the boundary layer wind which blows primarily across the bottom surface of the suspension, i.e., the surface of the suspension that is nearest the disk platter. The suspension of the present invention therefore presents a smaller profile to the wind which is created by the spinning disk than does a suspension in which the height of the microactuator extends downward from the load beam or flexure toward the spinning disk platter and into that wind. That boundary layer wind is uneven with respect to intensity and direction, and therefore causes unpredictable buffeting of the suspension. Because the design of the present invention reduces the suspension's profile to the uneven and unpredictable boundary layer wind, the suspension is therefore less susceptible to windage issues.

Another advantage of placing the microactuator on the load beam side is the elimination of problems associated with tight z-height tolerances for the microactuator and its associated mounting adhesive and other associated components. When the microactuator is placed on the slider side, the z-height of the microactuator extends downward toward the spinning disk platter, and care must be taken to ensure that the microactuator itself as mounted, and any adhesive applied to the microactuator, and any associated other components, do not extend so far downward that they might touch and thus damage the disk surface under various conditions such as during shock events. The maximum z-height of the microactuator, adhesive, etc. therefore present design and manufacturing tolerance issues and complicate particularly the assembly process. By mounting the microactuator on the load beam side, such tolerance issues are eliminated.

Yet another advantage of the invention is that because the microactuator is no longer mounted on the same side as the slider, it will not interfere with conventional shipping combs for suspensions.

Aspects of the invention are not limited to use with microactuators. The electrical connections described herein can be used or adapted for connection to other electrical components that may be advantageously placed on the load beam side of the suspension. The electrical connections to the microactuator or other electrical component as disclosed herein do not require any wiring to be routed around the outside, or around the back of, the load beam as in certain prior designs in which an electrical component was located on the top side of the load beam. Furthermore, no wiring needs to be routed around, in back of, or through the load beam. As used herein, the term "wiring" means a traditional wire, a flexible circuit trace, or other integrally formed continuous metal conductor for carrying an electrical signal and/or electrical power.

Exemplary embodiments of the invention will be further described below with reference to the drawings, in which like numbers refer to like parts. The drawing figures might not be to scale, and certain components may be shown in generalized or schematic form and identified by commercial designations in the interest of clarity and conciseness.

BRIEF DESCRIPTION OF THE DRAWINGS

FIG. 8 is a sectional view showing a microactuator and its physical and electrical connections, taken along section line B-B' in FIG. 7.

FIG. 9 is sectional view showing a microactuator and its physical and electrical connections according to a third illustrative embodiment.

DETAILED DESCRIPTION OF THE PREFERRED EMBODIMENTS

In the discussion that follows, the invention will be presented with reference to a piezoelectric (PZT) microactuator. It will be understood that the microactuator need not be of the PZT type. Furthermore, reference will be made to particular materials from which an exemplary suspension and its flexible circuit are constructed. Any reference to particular materials is for ease of discussion only and should not be construed as limiting the invention.

Figure 1:
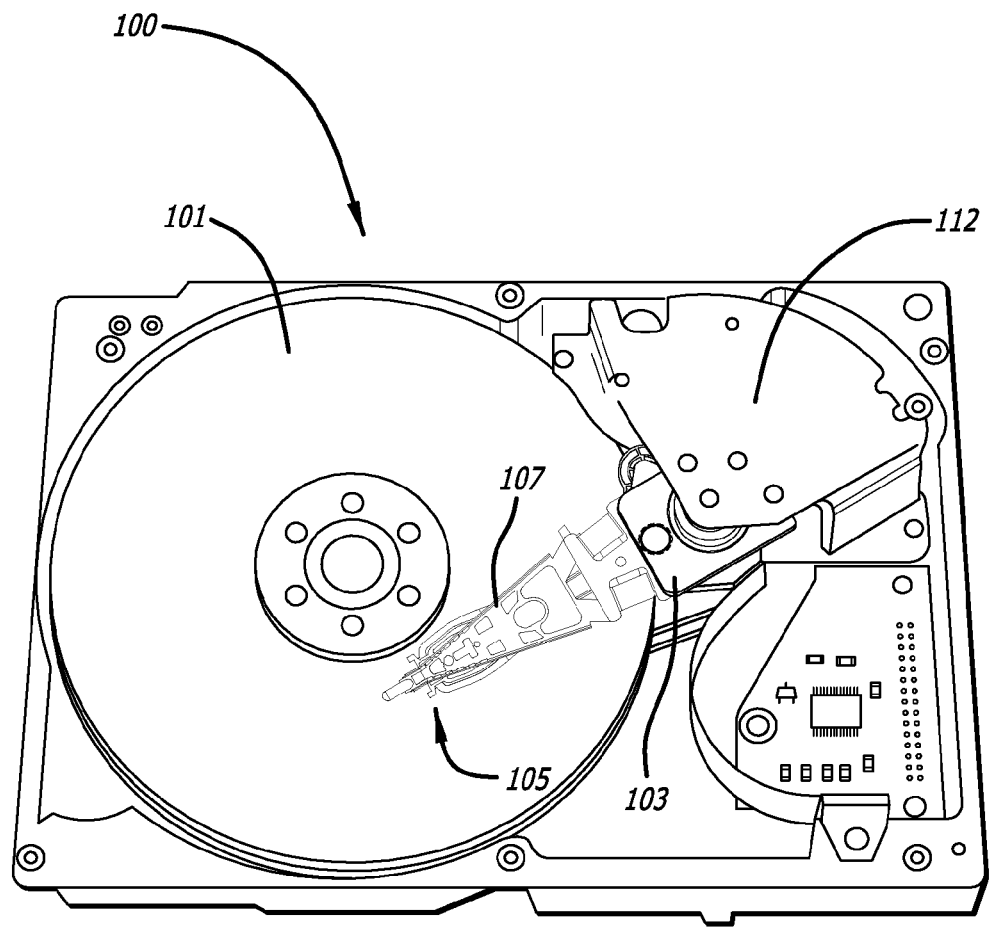
FIG. 1 is an oblique view of a prior art disk driving having a dual stage actuated suspension.
Figure 2:
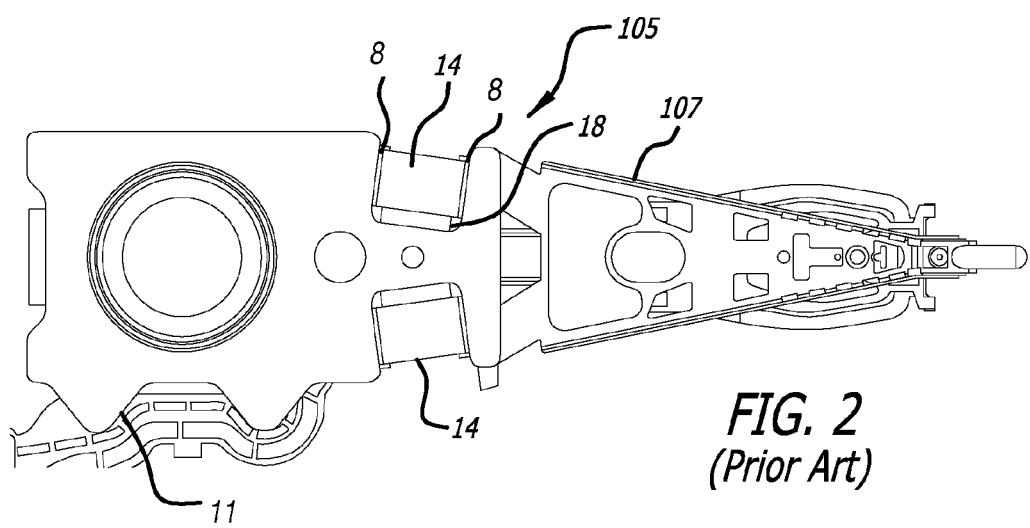
FIG. 2 is a top plan view of the suspension of FIG. 1.
Figure 3:
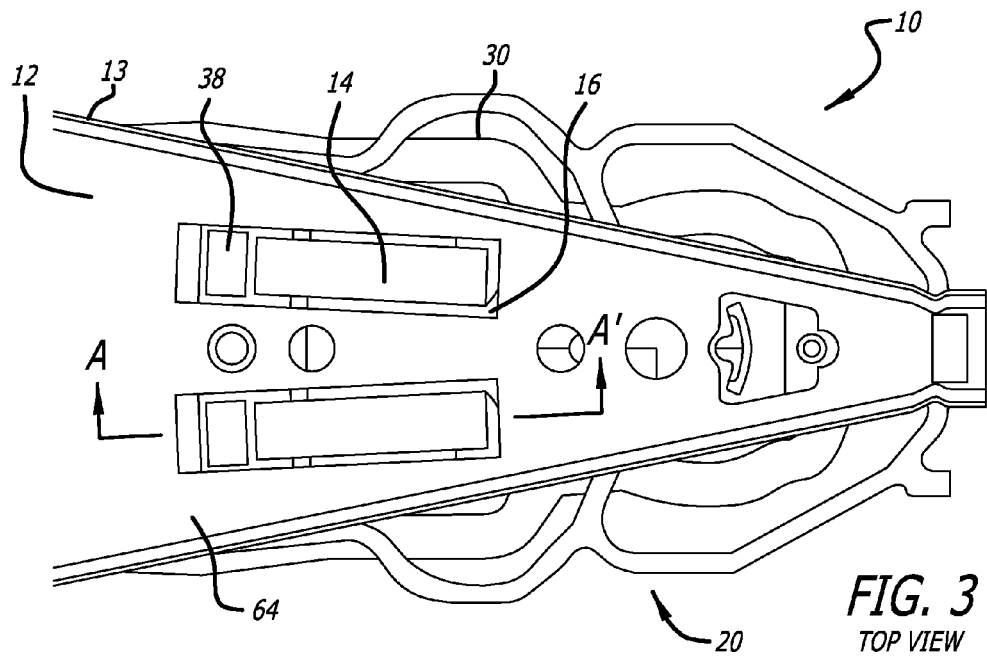
FIG. 3 is a top plan view of a distal end of a suspension according to first illustrative embodiment of the invention, viewed from the top or load beam side.

FIGS. 3-6 depict a first illustrative embodiment of the invention. FIG. 3 is a plan view from the load beam side which will be referred to as the top side, but with conductive epoxy bridge 40 (FIG. 6) not shown for clarity. FIG. 3 is thus a top plan view of the embodiment.

Figure 4:
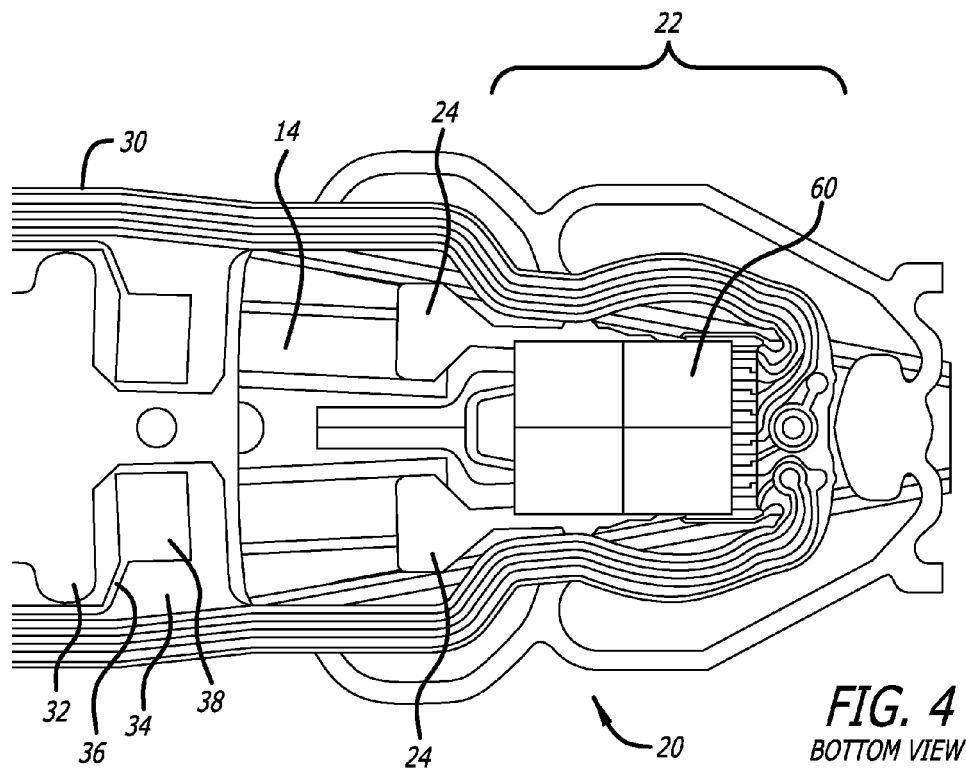
FIG. 4 is a bottom plan view of the suspension of FIG. 3.

FIG. 4 is a plan view from the slider side which will be referred to as the bottom side. FIG. 4 is thus a bottom plan view.

Figure 5:
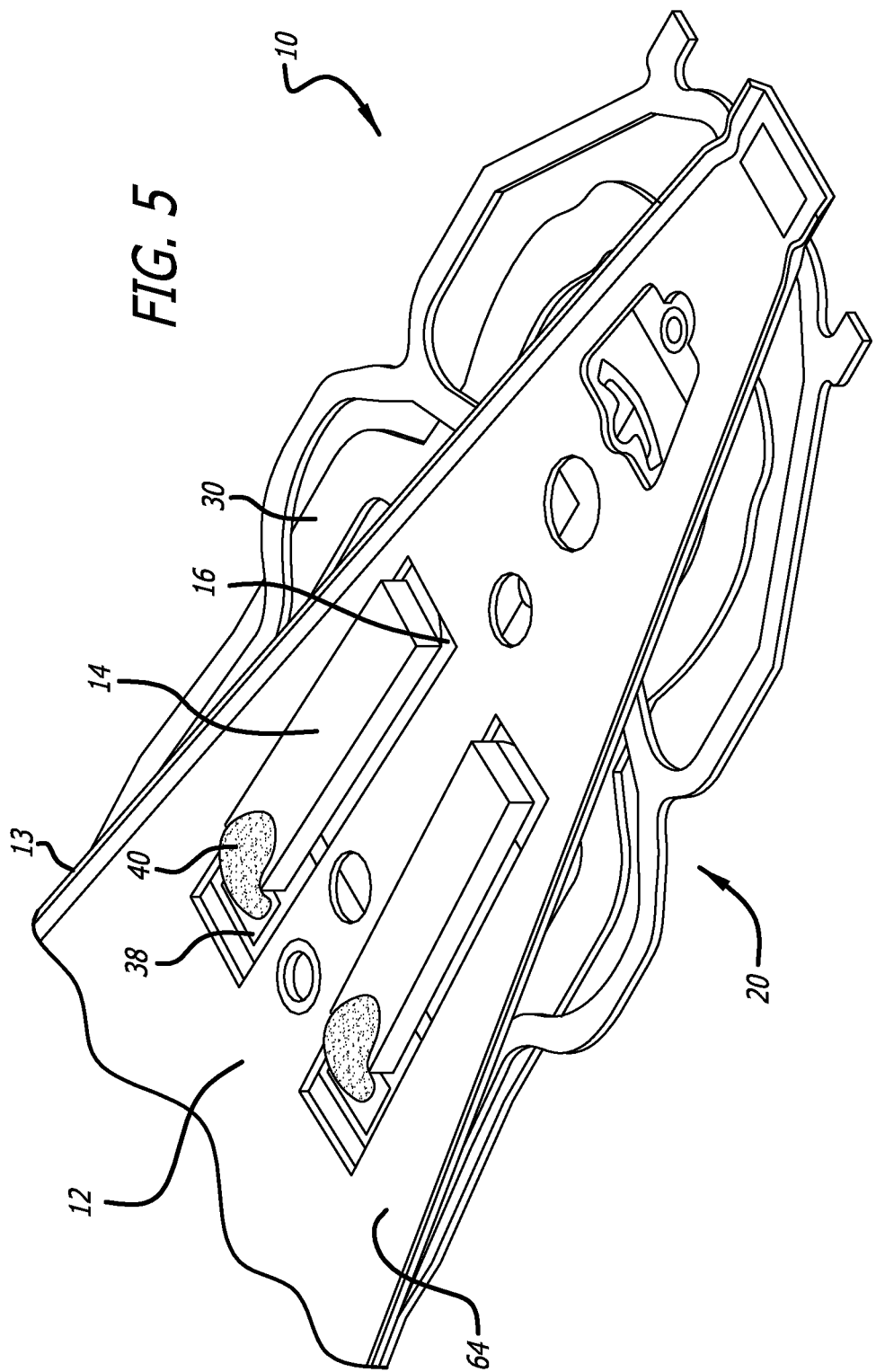
FIG. 5 is a top perspective view of the suspension of FIG. 3.
Figure 6:
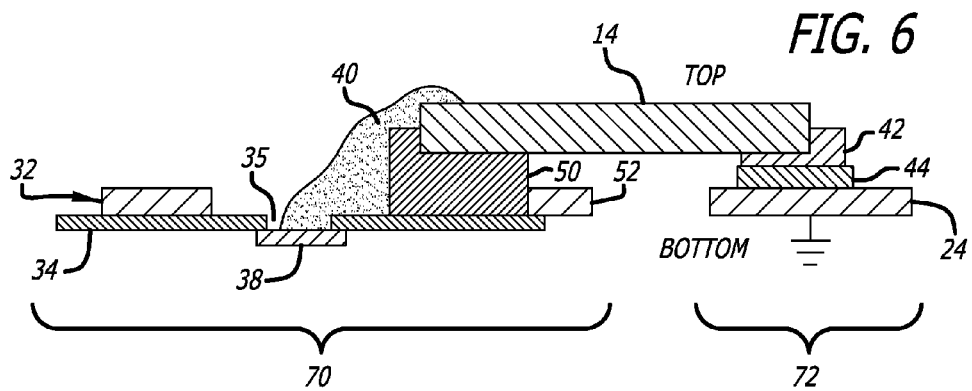
FIG. 6 is a sectional view showing a microactuator and its physical and electrical connections, taken along section line A-A' in FIG. 3.

FIG. 5 is a top perspective view of the suspension of FIG. 3 including conductive epoxy bridge 40. FIG. 6 is a sectional view showing the PZT microactuator 14 and its physical and electrical connections including conductive epoxy bridge 40, taken along section line A-A' in FIG. 3.

Suspension 10 includes a load beam 12 having a stiffening structure such as upturned edge rails 13 for stiffness. A flexure 20 is mounted such as by laser spot welding to the underside of load beam 12, i.e., to the side that is closest to the disk platter. Flexure 20 includes a gimbaled portion 22 and a flexible circuit 30 which are conventionally but not necessarily manufactured together. The gimbal allows gimbaled portion 22 including a slider tongue to which a head slider 60 is attached to pitch, yaw, and roll freely in response to irregularities in the spinning disk platter surface as the head slider rides an air bearing created by the boundary layer wind which is caused by the spinning disk platter. Head slider 60 is located entirely on the underside of load beam 12. The load beam has an aperture 16 therein which is larger than the footprint of PZT 14 in order to accommodate both the x- and y-dimensions of PZT 14 as well as its height. Aperture 16 is enclosed meaning that it defines a through-hole having an enclosed periphery around it. Flexure 20 typically has a substrate such as a stainless steel metal support layer 32, an insulating layer 34 such as polyimide, and a conductive layer 36 which is typically copper or copper alloy. Individual copper signal conductors formed from conductive layer 36 carry the various signals including drive and sense signals to and from the head slider, and carry the activation voltage for PZT 14. Polyimide 34 is selectively removed in selected area to form a via 35 thereby exposing copper conductor 36. The exposed areas of copper to which electrical connections will be made define copper contact pads 38 adjacent via 35.

PZT 14 extends in height at least partially through aperture 16 in stainless steel layer 32 to the side of the load beam that is opposite the side at which the flexure 20 and slider 60 are mounted. PZT 14 is thus located at least partially above the top major surface 64 of load beam 12. The wind profile of the suspension 20 is therefore less than it would be in a conventional design in which the PZT extends downward toward the disk drive and is not shielded from the wind.

The left hand side of PZT 14 as viewed in FIG. 3 is affixed to a relatively fixed portion of flexure 20, or could also be affixed to load beam 12, such as by non-conductive adhesive 50 such as non-conductive epoxy. Non-conductive adhesive 50 can adhere PZT 14 to exposed polyimide layer 34. In FIG. 6 a portion 52 of stainless steel layer 32 extends to non-conductive adhesive 50 but not underneath it. Alternatively, stainless steel 52 could extend underneath non-conductive adhesive 50, or could be eliminated. An electrical connection is established from the top surface of PZT 14 which serves as the driven electrode to copper contact pad 38 that is exposed through aperture 35 in polyimide layer 34. In the embodiment, the electrical connection for the PZT driving voltage is made by conductive adhesive 40 being applied so as to extend from the top surface of PZT 14 to copper contact pad 38, the adhesive thereafter being hardened. Conductive epoxy 40 thus forms an electrical bridge from copper contact pad 38 to the top side which is the driven electrode of PZT 14. PZT 14 is grounded at its ground electrode, which is located on the bottom side, by conductive adhesive such as conductive epoxy 42 to stainless steel arm 24, preferably with a gold layer 44 having been deposited on stainless steel arm 24 to improve the quality and corrosion resistance of the electrical connection. As viewed in FIG. 6, the left hand portion 70 of flexure 20 is fixed to load beam 12 such as by welding of the stainless steel body of load beam 12 to the stainless steel layer 32 of flexure 20. Portion 70 of flexure 20 is therefore relatively fixed. The right hand portion 72 of flexure 20 is gimbaled so as to move relatively freely with respect to load beam 12. PZT 14 thus is connected to and extends from relatively fixed portion 70 of flexure 20 to a relatively movable portion 72 which includes the gimbal on which head slider 60 is mounted, so that actuation of PZT 14 affects fine movements of head slider 60. In the embodiment shown, the distal end of PZT 14 is affixed to stainless steel arm 24 which is most clearly seen in FIG. 4, and which is part of, or connects to, gimbaled region 22.

Although load beam 12 is itself not shown in FIG. 6, the vertical extent of PZT 14 therefore extends from flexure 20 up through aperture 16 in load beam 12, and extends at least partially above the top major surface 64 of load beam 12 and into the volume between edge rails 13 which are bent so that they extend upward from the top surface of load beam 12. In a typical commercial embodiment as contemplated, PZT 14 will be thinner than slider 60 and will be significantly thinner than edge rails 13. Depending on the exact thicknesses of the various components of the suspension, however, PZT 14 may extend partially into the volume between edge rails 13 but not to the top of edge rails 13, with a majority but less than all of the volume of the microactuator being disposed above top major surface 64 of the load beam as is currently expected to be typical, the top of PZT 14 may be coincident with the top of edge rails 13, or the PZT 14 and its volume may extend above edge rails 13. Regardless of which of those possible configurations exist, the profile of PZT 14 is at least partially above the top surface of load beam 12 and has thus been moved out of the wind created by the spinning disk. The effective wind profile of the suspension has therefore been reduced, thus reducing the amount of wind buffeting experienced by the suspension. This increases the overall stability, speed, and accuracy of the reading and writing processes.

Figure 10:
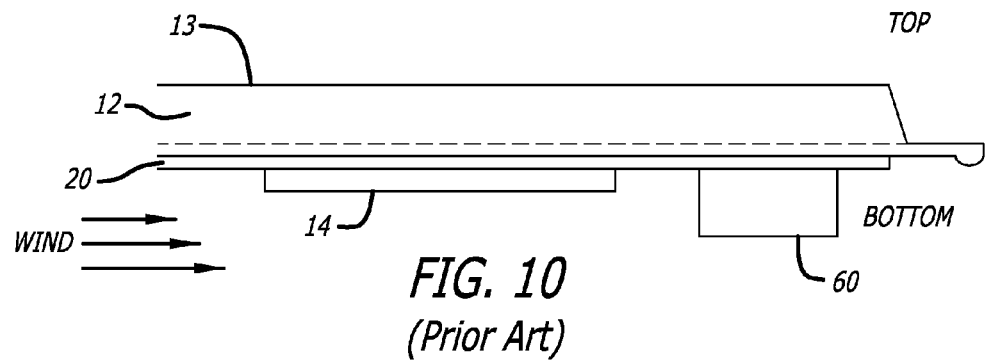
FIG. 10 is a simplified side elevation view of a prior art GSA suspension.
Figure 11:
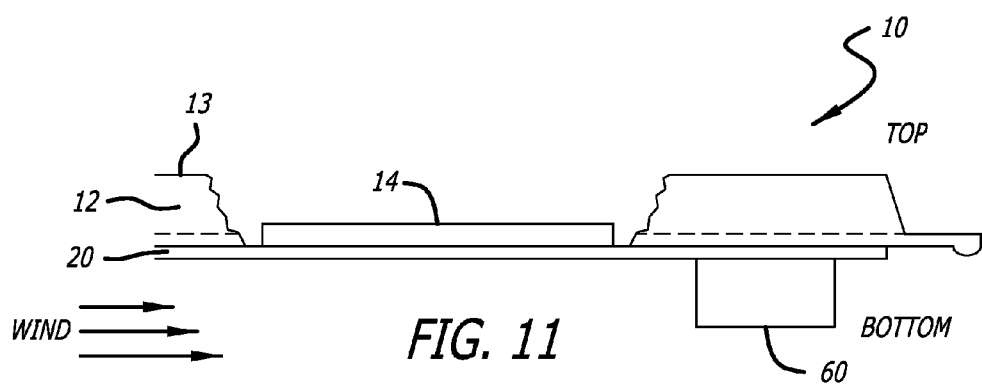
FIG. 11 is a simplified side elevation view of the suspension of FIG. 3.

The invention's effect of reducing the wind profile of the suspension is illustrated in FIGS. 10-11. FIG. 10 is a simplified side elevation view of a prior art GSA suspension, and FIG. 11 is a simplified side elevation view of the suspension according to the invention in FIG. 3, with edge rail 13 partially cut away to reveal PZT 14. By moving PZT 14 from below load beam 12 where the wind is, to mostly above load beam 12 which is on the side of the load beam opposite the wind, PZT 14 has been moved out of the wind thus reducing windage effects on suspension 10.

As in the previous embodiment described above and shown in FIGS. 3 and 4, in the following embodiments of FIGS. 7-9 suspension 10 includes a load beam 12 having a stiffening structure such as upturned edge rails 13 for stiffness. A flexure 20 is mounted such as by laser spot welding to the underside of load beam 12, i.e., to the side that is closest to the disk platter, also called the bottom side as seen in FIG. 4. Flexure 20 includes a gimbaled portion 22 and a flexible circuit 30 which are conventionally but not necessarily manufactured together. The gimbal allows gimbaled portion 22 including a slider tongue to which a head slider 60 is attached to pitch, yaw, and roll freely in response to irregularities in the spinning disk platter surface as the head slider rides an air bearing created by the boundary layer wind which is caused by the spinning disk platter. Head slider 60 is located entirely on the underside of load beam 12.

Figure 7:
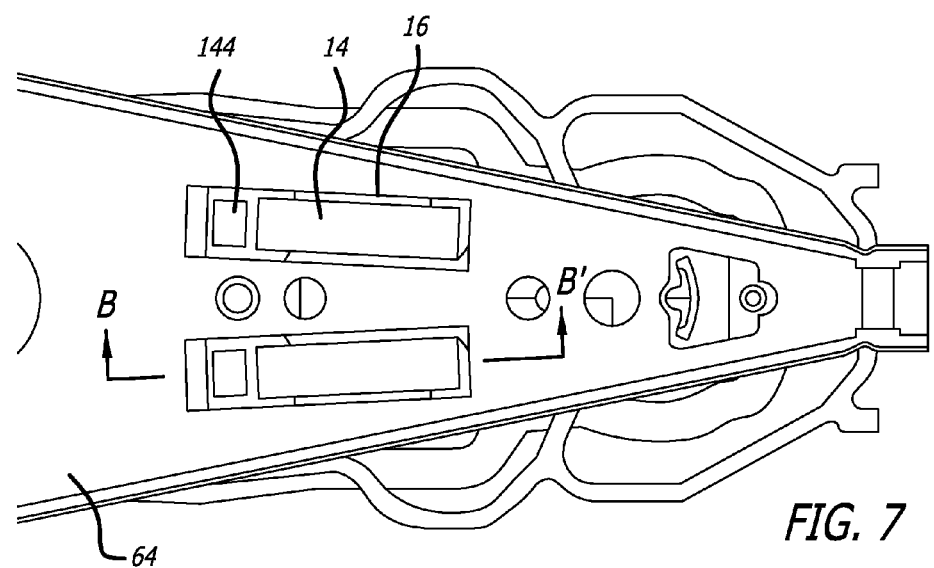
FIG. 7 is a top plan view of the distal end of a suspension according to a second illustrative embodiment.

FIG. 7 is top plan view of the distal end of a suspension according to a second illustrative embodiment, with conductive epoxy bridge 140 (FIG. 8) not shown for clarity of illustration. FIG. 8 is a sectional view of the suspension of FIG. 7 showing microactuator 14 and its physical and electrical connections including conductive epoxy bridge 140, taken along section line B-B' in FIG. 7. In this embodiment the conductive adhesive 140 does not extend all the way to an exposed copper contact pad. Instead, copper contact pad 138 is plated or is otherwise electrically extended all the way through the aperture in polyimide layer 134 to an electrically isolated island 142 of stainless steel, which has been isolated from the rest of stainless steel layer 132 such as by etching. The island 142 of stainless steel is preferably plated with nickel (not shown) on its bottom side prior to the copper contact pad being plated onto it, and is preferably plated with gold 144 on its top side before the conductive epoxy bridge 140 is dispensed onto it. The nickel layer facilitates a good bond between the stainless steel and copper layers, and the gold layer prevents corrosion. This structure employing the isolated island 142 of stainless steel brings the PZT driving voltage closer to PZT 14 before it is picked up and carried from there by conductive adhesive 140.

FIG. 9 is sectional view showing a microactuator and its physical and electrical connections similar to the view in FIG. 8, but according to a third illustrative embodiment which uses a PZT 114 having a wrap-around electrode. PZTs having wrap-around electrodes are known. A first electrode 115 covers the top surface of PZT 114 and also wraps around to a minority of the bottom surface. A second electrode 117 covers a majority of the bottom surface of PZT 114. In this way, both electrodes are accessible from a single side of the PZT, thus generally simplifying the electrical connections to the PZT. In this embodiment no bridge of conductive epoxy is needed. Instead, conductive epoxy 240 electrically connects wrap-around electrode 115 to gold layer 144 on isolated island 142 of stainless steel without having to bridge all the way up to the top surface of PZT 114.

In a further embodiment (not shown), instead of the fixed end of the PZT being affixed to a relatively fixed portion of the flexure, that end of the PZT could be affixed to the load beam. In a still further embodiment (not shown), the invention can be used to provide mechanical and electrical connections to an electrical component other than a PZT. Such an electrical component could include: a sensor such as an accelerometer, a temperature sensor, or a strain gauge; a resistive heating element; or other component. By placing such a component on the opposite side of the flexure and extending it upward through an aperture in the load beam so as to be disposed at least partially above the top surface of the load beam, the component is at least partially shielded from the disk wind, thus reducing windage and the problems associated with windage.

It will be understood that the terms "generally," "approximately," "about," "substantially," and the like as used within the specification and the claims herein allow for a certain amount of variation from any exact dimensions, measurements, and arrangements, and that those terms should be understood within the context of the description and operation of the invention as disclosed herein.

It will further be understood that terms such as "top," "bottom," "above," and "below" as used within the specification and the claims herein are terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

We claim:

1. A dual stage actuated suspension for a disk drive, the suspension comprising a load beam and a flexure attached to the load beam, the flexure comprising a gimbal and a flexible circuit, wherein the flexible circuit comprises a metal support layer, an insulating layer thereon, and a signal conducting layer thereon, the suspension further comprising:
   a microactuator operatively connected from a relatively fixed portion of the suspension to a portion of the flexible circuit which is movable relative to the load beam, the movable portion of the flexible circuit being attached to a head slider mounted thereto such that activation of the microactuator pushes against the flexible circuit thereby effecting fine movements of the head slider for fine position control of the head slider;
   wherein the load beam has an aperture therethrough that is larger than the microactuator, the microactuator extending in height away from the flexure and at least partially through said load beam aperture such that the microactuator extends in height at least partially to a side of the load beam that is opposite to a side of the load beam at which the flexure is mounted.

2. The suspension of claim 1 wherein no wiring to the microactuator extends around, in back of, or through the load beam.

3. The suspension of claim 1 wherein the relatively fixed portion of the suspension comprises a relatively fixed portion of the flexure.

4. A dual stage actuated suspension for a disk drive, the suspension comprising a load beam and a flexure attached to the load beam, the flexure comprising a gimbal and a flexible circuit, the suspension further comprising:
   a microactuator operatively connected from a relatively fixed portion of the suspension to a portion of the flexure which is movable relative to the load beam, the movable portion of the flexure having a head slider mounted thereto such that activation of the microactuator effects fine movements of the head slider for fine position control of the head slider;
   wherein:
   the load beam has an aperture therethrough that is larger than the microactuator, the microactuator extending in height away from the flexure and at least partially through said load beam aperture such that the microactuator extends in height at least partially to a side of the load beam that is opposite to a side of the load beam at which the flexure is mounted;
   the relatively fixed portion of the suspension comprises a relatively fixed portion of the flexure;
   the flexure comprises an insulating layer and a signal conducting layer;
   the relatively fixed portion of the flexure has an aperture through the insulating layer to the signal conducting layer, a portion of the signal conducting layer adjacent the aperture defining an electrical contact pad; and
   a conductive path extending from an electrode of the microactuator to the electrical contact pad.

5. The suspension of claim 4 wherein the conductive path comprises conductive adhesive.

6. The suspension of claim 4 wherein the flexure further comprises a metal support layer, and the conductive path comprises conductive adhesive and an electrically isolated island of the metal support layer.

7. The suspension of claim 6 wherein the conductive path further comprises a gold layer plated on the metal support layer.

8. A dual stage actuated suspension for a disk drive, the suspension comprising:
   a load beam having a top side and an underside, the load beam further having upturned edge rails to provide mechanical stiffness to the load beam;

a flexure affixed to the underside of the load beam, the flexure comprising a gimbal and a flexible circuit;

a head slider mounted on the flexure, the head slider being disposed entirely on the underside of the load beam; and a microactuator mounted at a first end and an opposite second end thereof to the flexure, the microactuator not being mounted directly to the load beam or to an actuator arm of the suspension, the microactuator arranged to effect fine movements of the head slider when activated;

wherein the microactuator is mounted such that it extends in height up through an aperture in the load beam;

whereby a volume of the microactuator lies at least partially above a top major surface of the load beam thereby reducing a wind profile of the suspension.

9. A dual stage actuated suspension for a disk drive, the suspension comprising:

a load beam having a top side and an underside, the load beam further having upturned edge rails to provide mechanical stiffness to the load beam;

a flexure affixed to the underside of the load beam, the flexure comprising a gimbal and a flexible circuit, the flexure further comprising a metal support layer, an insulative layer, and a conductive layer;

a head slider mounted on the flexure, the head slider being disposed entirely on the underside of the load beam; and a microactuator mounted to at least a first end thereof to the flexure, the microactuator arranged to effect fine movements of the head slider when activated;

wherein:

the metal support layer of the flexure includes an island of metal that is electrically isolated from ground;

a conductive path to a driven electrode of the microactuator includes the isolated island of metal in the support layer, the isolated metal island providing a conductive path to transmit a driving voltage for the microactuator from a same side of the flexure as the head slider to a second side of the flexure opposite the head slider; and the microactuator is mounted such that it extends in height up through an aperture in the load beam;

whereby a volume of the microactuator lies at least partially above a top major surface of the load beam thereby reducing a wind profile of the suspension.

10. A dual stage actuated suspension for a disk drive, the suspension comprising:

a load beam having a top side and an underside, the load beam further having upturned edge rails to provide mechanical stiffness to the load beam;

a flexure affixed to the underside of the load beam, the flexure comprising a gimbal and a flexible circuit;

a head slider mounted on the flexure, the head slider being disposed entirely on the underside of the load beam; and a microactuator mounted to at least a first end thereof to the flexure, the microactuator arranged to effect fine movements of the head slider when activated;

wherein:

the microactuator has a wrap-around electrode;

a driving voltage connection and a ground connection of the microactuator are both made on a bottom surface thereof, and the driving voltage connection does not extend to a top surface of the microactuator; and the microactuator is mounted such that it extends in height up through an aperture in the load beam;

whereby a volume of the microactuator lies at least partially above a top major surface of the load beam thereby reducing a wind profile of the suspension.

11. The suspension of claim 9 wherein conductive epoxy forms an electrical bridge from the isolated island of metal in the flexure to the driven electrode.

12. The suspension of claim 8 wherein:

the flexure further comprises a metal support layer, an insulative layer, and a conductive layer comprising a plurality of conductive signal traces, at least some of said signal traces providing signal paths to and from the head slider; and a driving voltage for a driven electrode of the microactuator passes from one of said signal traces through an aperture in the insulative layer.

13. The suspension of claim 12 wherein the driven electrode of the microactuator is located on a top face of the microactuator facing away from the flexure.

14. The suspension of claim 13 wherein a conductive path for the driving voltage includes conductive adhesive extending through the aperture in the insulative layer to the micro actuator's driven electrode.

15. The suspension of claim 8 wherein no wiring to the microactuator extends around, in back of, or through the load beam.

16. A dual stage actuated suspension for a disk drive, the suspension comprising:

a load beam having a top side and an opposite underside, the top side defining a top major surface of the load beam, the load beam having a stiffening structure extending upwards from the top major surface, the load beam further having an enclosed aperture therethrough;

a flexure mounted to the underside of the load beam, the flexure comprising a metal support layer, an insulating layer, and a copper conductive layer;

a head slider mounted on the underside of the load beam; and a microactuator for effecting fine movements of the head slider, the microactuator being mounted to the metal support layer of the flexible circuit on the underside of the load beam such that the microactuator extends up through the aperture in the load beam, the microactuator not being mounted directly to the load beam or to an actuator arm of the suspension;

wherein a majority of a volume occupied by the microactuator is located above the top major surface of the load beam.

17. The suspension of claim 16 wherein:

a driving voltage for the microactuator is provided from a copper contact pad of the conductive layer to a driven electrode on a top surface of the microactuator.

18. The suspension of claim 17 wherein conductive epoxy forms a conductive bridge that carries the driving voltage from the copper contact pad to the driven electrode.

19. A suspension for a hard disk drive comprising:

a load beam having a top side and an underside;

a flexure affixed to the underside of the load beam, the flexure including a flexible circuit comprising a metal support layer adjacent the underside of the load beam, an insulative layer, and a conductive layer comprising a plurality of electrical conductors;

a head slider mounted to the flexure and disposed on the underside of the load beam;

an electrical component affixed to the metal support layer of the flexure and not affixed directly to either the load beam or an actuator arm of the suspension, the electrical component extending up through an aperture in the load beam such that at least some of its volume is disposed above a top surface of the flexure on a side of the flexure away from the head slider; and an electrical connection from one of the electrical conductors through an aperture in the insulative layer to the electrical component.

20. The suspension of claim 19 wherein the electrical component is selected from the group consisting of a piezoelectric microactuator, a sensor, and a heating element.

\* \* \* \* \*

UNITED STATES PATENT AND TRADEMARK OFFICE
CERTIFICATE OF CORRECTION

| | |
|---|---|
| PATENT NO. | : 9,111,559 B1 |
| APPLICATION NO. | : 14/332046 |
| DATED | : August 18, 2015 |
| INVENTOR(S) | : Peter Hahn, Kuen Chee Ee and Long Zhang |

It is certified that error appears in the above-identified patent and that said Letters Patent is hereby corrected as shown below:

Claims

In claim 9, column 9, line 27, delete "mounted to" and insert --mounted at--.

In claim 10, column 9, line 54, delete "mounted to" and insert --mounted at--.

In claim 19, column 11, line 2, after "conductors" insert --extends--.

Signed and Sealed this
Twenty-second Day of December, 2015

Michelle K. Lee
*Director of the United States Patent and Trademark Office*